US010634985B2

(12) United States Patent
Yu et al.

(10) Patent No.: US 10,634,985 B2
(45) Date of Patent: Apr. 28, 2020

(54) PROJECTION SYSTEM AND PROJECTION SCREEN SUPPORTING DEVICE

(71) Applicants: Hisense Co., Ltd., Qingdao (CN); HISENSE USA CORPORATION, Suwanee, GA (US); HISENSE INTERNATIONAL CO., LTD., Qingdao (CN)

(72) Inventors: Ting Yu, Qingdao (CN); Wensheng Lu, Qingdao (CN); Xianglai Pang, Qingdao (CN)

(73) Assignees: Hisense Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 16/180,974

(22) Filed: Nov. 5, 2018

(65) Prior Publication Data
US 2019/0072843 A1 Mar. 7, 2019

Related U.S. Application Data

(63) Continuation-in-part of application No. 15/351,825, filed on Nov. 15, 2016, now Pat. No. 10,139,720.

(30) Foreign Application Priority Data

May 11, 2016 (CN) .......................... 2016 1 0310490
May 11, 2016 (CN) ..................... 2016 2 0427692 U

(51) Int. Cl.
*G03B 21/58* (2014.01)
*G03B 21/56* (2006.01)
(Continued)

(52) U.S. Cl.
CPC ........... *G03B 21/58* (2013.01); *F16M 11/041* (2013.01); *F16M 11/045* (2013.01);
(Continued)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS 2,242,386 A * 5/1941 Block ...................... D06C 3/00
38/102.1
3,087,186 A * 4/1963 Budd ........................ A47L 1/00
15/268
(Continued)

FOREIGN PATENT DOCUMENTS

CN 201675396 U 12/2010
CN 202049311 U 11/2011
(Continued)

OTHER PUBLICATIONS

Office Action from Chinese Application No. 201610310490.4 dated Sep. 5, 2017 (7 pages).
(Continued)

*Primary Examiner* — Clayton E. LaBalle
*Assistant Examiner* — Kevin C Butler
(74) *Attorney, Agent, or Firm* — Harness, Dickey & Pierce, P.L.C.

(57) ABSTRACT

This disclosure relates to the field of projection display technologies, and discloses a projection system and a projection screen supporting device, the projection system including a projection screen and a projection device, and further a projection screen supporting device, the projection screen being installed on a bracket body of the projection screen supporting device, where the projection screen sup-
(Continued)

porting device includes the bracket body, a supporting assembly, and a projection screen hanging assembly; the bracket body includes a first standing pole and a second standing pole, both of which are arranged substantially parallel to each other; the supporting assembly is fixed on the bracket body to support the bracket body; and the projection screen hanging assembly is arranged on the bracket body, at an adjustable position in the direction in which the first standing pole and the second standing pole extend, to hang a projection screen on the bracket body.

13 Claims, 7 Drawing Sheets

(51) Int. Cl.
F16M 11/04 (2006.01)
F16M 11/22 (2006.01)
F16M 13/02 (2006.01)
F16M 11/18 (2006.01)

(52) U.S. Cl.
CPC .......... *F16M 11/046* (2013.01); *F16M 11/18* (2013.01); *F16M 11/22* (2013.01); *F16M 13/02* (2013.01); *G03B 21/56* (2013.01)

(58) Field of Classification Search
USPC ......................................... 359/443
See application file for complete search history.

(56) References Cited

U.S. PATENT DOCUMENTS

| | | | | |
|---|---|---|---|---|
| 3,583,466 A * | 6/1971 | Dreyer | | G03B 21/58 160/351 |
| 4,700,498 A * | 10/1987 | Perutz | | G09F 1/10 40/603 |
| 6,254,527 B1* | 7/2001 | August | | A47C 21/00 160/10 |
| 6,736,516 B1* | 5/2004 | Francis Kepley, Jr. | | G03B 21/14 248/918 |
| 6,870,672 B2* | 3/2005 | Stumpfl | | G03B 21/58 248/465 |
| 7,623,290 B2* | 11/2009 | Liang | | G03B 21/56 359/443 |
| 7,810,658 B2* | 10/2010 | Clark | | A47F 5/137 211/189 |
| 7,874,090 B2* | 1/2011 | Flagg | | G09F 15/0068 116/63 P |
| 7,933,068 B2* | 4/2011 | Peterson | | G03B 3/00 359/443 |
| 7,936,505 B2* | 5/2011 | Enochs | | G03B 21/56 359/443 |
| 7,974,004 B2* | 7/2011 | Maruyama | | G03B 21/58 160/351 |
| 8,045,264 B2* | 10/2011 | Elliott | | G03B 21/58 160/377 |
| 8,439,323 B1* | 5/2013 | Bae | | A47G 1/1613 248/317 |
| 8,641,007 B2* | 2/2014 | Chen | | A47B 97/001 211/71.01 |
| 8,693,093 B2* | 4/2014 | Kepley, Jr. | | G03B 21/30 248/918 |
| 8,959,813 B2* | 2/2015 | Denby | | A47F 5/10 211/175 |
| 9,119,487 B2* | 9/2015 | Angvall | | A47F 5/0081 |
| 9,140,963 B2* | 9/2015 | Corey | | G03B 21/10 |
| 9,551,920 B2* | 1/2017 | Risher | | G03B 21/56 |
| 2005/0200951 A1* | 9/2005 | Redmon | | G09F 1/12 359/443 |
| 2005/0270497 A1* | 12/2005 | Kepley, Jr. | | G03B 23/08 353/79 |
| 2010/0079860 A1* | 4/2010 | Unno | | G03B 21/58 359/443 |

FOREIGN PATENT DOCUMENTS

| | | | | |
|---|---|---|---|---|
| CN | 203068080 | * | 7/2013 | ............ F16M 11/04 |
| CN | 203068080 U | | 7/2013 | |
| CN | 103807577 A | | 5/2014 | |
| CN | 104214492 A | | 12/2014 | |
| CN | 205781805 | * | 12/2016 | ............ F16M 11/04 |
| CN | 205781805 U | | 12/2016 | |

OTHER PUBLICATIONS

Office Action from Chinese Application No. 201610310490.4 dated May 2, 2018 (6 pages).

* cited by examiner

PROJECTION SYSTEM AND PROJECTION SCREEN SUPPORTING DEVICE

This application is a continuation-in-part of U.S. patent application Ser. No. 15/351,825, filed Nov. 15, 2016, which claims the benefit and priority of Chinese Patent Application No. 201610310490.4, filed May 11, 2016, and Chinese Patent Application No. 201620427692.2, filed May 11, 2016. The entire disclosures of the above applications are incorporated herein by reference.

FIELD

The present disclosure relates to the field of projection display technologies, and particularly to a projection system and a projection screen supporting device.

BACKGROUND

This section provides background information related to the present disclosure which is not necessarily prior art.

In the field of projection display technologies, ultra-short focus projection is an emerging projection display mode. In an ultra-short focus projection system, it is so crucial to install a projection screen thereof with an ultra-large size that has a direct influence upon a display effect of the ultra-short focus projection system.

At preset the projection screen in the ultra-short focus projection system is typically installed by arranging installation holes directly through a wall, and then installing the projection screen on the wall.

However there may be such drawbacks in the installation solution above that, for example, if the projection screen is installed on the wall, then the wall will be punctured, and thus damaged; and moreover if the position of the projection screen needs to be adjusted, then the wall will be punctured again, which may be time-consuming and labor-consuming, and leave irreparable destructive marks at the original position of the projection screen.

SUMMARY

This section provides a general summary of the disclosure, and is not a comprehensive disclosure of its full scope or all of its features.

Embodiments of the disclosure provides a projection system, and a projection screen supporting device used for supporting a projection screen of the projection system without damaging any wall to thereby enable the projection screen to be installed conveniently.

Some embodiments of the disclosure provide a projection system, including a projection screen, a projection device and a projection screen supporting device configured to install the projection screen, wherein: the projection screen supporting device includes a supporting assembly, a bracket body, a first hanging piece and a second hanging piece; the supporting assembly is fixed on the bracket body to support the bracket body; the bracket body includes a first standing pole and a second standing pole, both of which are arranged substantially parallel to each other, wherein a first slideway, extending in a direction in which the first standing pole extends, is arranged on the first standing pole, and a second slideway, extending in a direction in which the second standing pole extends, is arranged on the second standing pole; the first hanging piece includes a first slider, and a first connection piece removably installed on the first slider, wherein the first slider is configured to be slidably engaged with the first slideway to adjust a position of the first slider, and the first connection piece is configured to lock the first slider on the first slideway; the second hanging piece includes a second slider, and a second connection piece removably installed on the second slider, wherein the second slider is configured to be slidably engaged with the second slideway to adjust a position of the second slider, and the second connection piece is configured to lock the second slider on the second slideway; and the bracket body is configured to hang the projection screen thereon via the first hanging piece and the second hanging piece.

Some embodiments of the disclosure provide a projection screen supporting device, including a supporting assembly, a bracket body, a first hanging piece and a second hanging piece; wherein the supporting assembly is fixed on the bracket body to support the bracket body; the bracket body includes a first standing pole and a second standing pole, both of which are arranged substantially parallel to each other, wherein a first slideway, extending in a direction in which the first standing pole extends, is arranged on the first standing pole, and a second slideway, extending in a direction in which the second standing pole extends, is arranged on the second standing pole; the first hanging piece includes a first slider, and a first connection piece removably installed on the first slider, wherein the first slider is configured to be slidably engaged with the first slideway to adjust a position of the first slider, and the first connection piece is configured to lock the first slider on the first slideway; the second hanging piece includes a second slider, and a second connection piece removably installed on the second slider, wherein the second slider is configured to be slidably engaged with the second slideway to adjust a position of the second slider, and the second connection piece is configured to lock the second slider on the second slideway; and the bracket body is configured to hang a projection screen thereon via the first hanging piece and the second hanging piece.

Some embodiments of the disclosure provide a projection screen supporting device including a supporting assembly, a bracket body configured to hang a projection screen thereon, a first triangular fixing piece, a second triangular fixing piece, a first hanging piece, a second hanging piece, a third hanging piece, and a fourth hanging piece; wherein the bracket body includes a first standing pole, a second standing pole and a first traversing pole; wherein the first standing pole and the second standing pole are arranged substantially parallel to each other, a first slideway, extending in a direction in which the first standing pole extends, is arranged on the first standing pole, a second slideway, extending in a direction in which the second standing pole extends, is arranged on the second standing pole, and a third slideway, extending in a direction in which the first traversing pole extends, is arranged on the first traversing pole; the first triangular fixing piece includes a first sidewall and a second sidewall substantially vertical to each other, and the second triangular fixing piece includes a third sidewall and a fourth sidewall substantially vertical to each other; wherein holes are provided on the first sidewall, the second sidewall, the third sidewall and the fourth sidewall respectively; the first hanging piece includes a first slider, and a first connection piece removably installed on the first slider, wherein the first slider is configured to be slidably engaged with the first slideway, and the first connection piece is configured to be arranged through the hole on the second sidewall to lock the first slider on the first slideway to fix the first triangular fixing piece and the first standing pole; the second hanging piece includes a second slider, and a second connection piece removably installed on the second slider, wherein the second slider is configured to be slidably engaged with the second slideway, and the second connection piece is configured to be arranged through the hole on the fourth sidewall to lock the second slider on the second slideway to fix the second triangular fixing piece and the second standing pole; the third hanging piece includes a third slider, and a third connection piece removably installed on the third slider, wherein the third slider is configured to be slidably engaged with the third slideway, and the third connection piece is configured to be arranged through the hole on the first sidewall and lock the third slider on the third slideway to fix the first triangular fixing piece and the first traversing pole; and the fourth hanging piece includes a fourth slider, and a fourth connection piece removably installed on the fourth slider, wherein the fourth slider is configured to be slidably engaged with the third slideway, and the fourth connection piece is configured to be arranged through the hole on the third sidewall and lock the fourth slider on the third slideway to fix the second triangular fixing piece and the first traversing pole.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
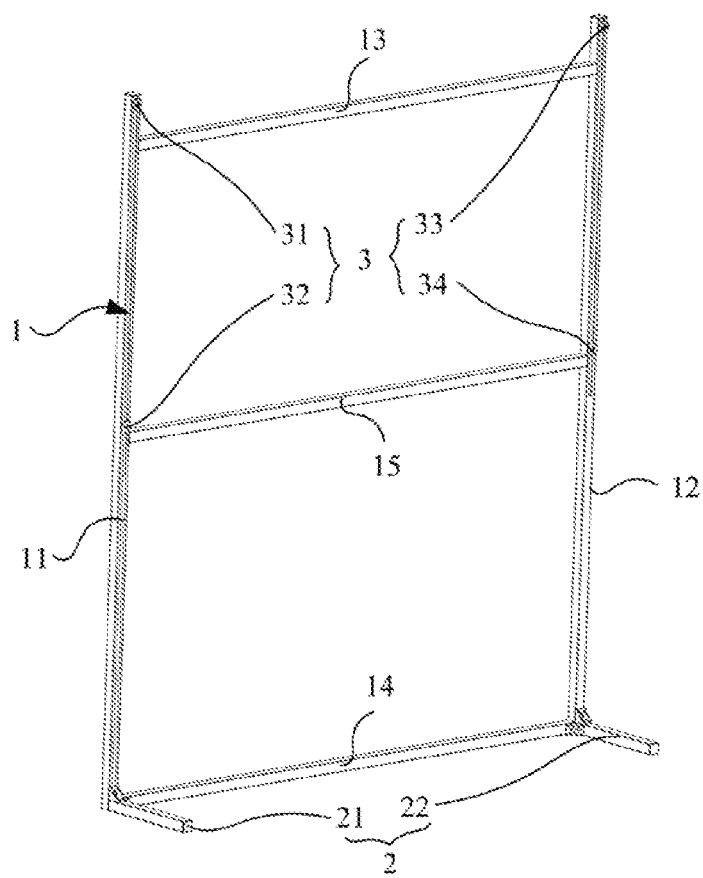
FIG. 1 is a schematic structural diagram of a projection screen supporting device according to some embodiments of the disclosure.

Some embodiments of the disclosure provide a projection screen supporting device, and as illustrated in FIG. 1, the projection screen supporting device includes followings.

A bracket body 1 including a first standing pole 11, a second standing pole 12, a first traversing pole 13, and a second traversing pole 14, where the first standing pole 11 is opposite to the second standing pole 12, and the first traversing pole 13 is opposite to the second traversing pole 14; the first traversing pole 13 has one end connected with one end of the first standing pole 11, and the other end connected with one end of the second standing pole 12; and the second traversing pole 14 has one end connected with the other end of the first standing pole 11, and the other end connected with the other end of the second standing pole 12, that is, a quadrangular frame structure of the bracket body 1 is formed by the cooperating of the first standing pole 11, the second standing pole 12, the first traversing pole 13, and the second traversing pole 14.

The projection screen supporting device further includes a supporting assembly 2 fixed on the bracket body 1 to support the bracket body 1.

In at least one embodiment, if the bracket body 1 is supported on the horizontal plane by the supporting assembly 2, then the first standing pole 11 and the second standing pole 12 in the bracket body 1 can extend vertically so that the bracket body 1 remains vertical.

In at least one embodiment, alternatively the first standing pole 11 and the second standing pole 12 can be inclined at some angle from the vertical direction.

The projection screen supporting device further includes a projection screen hanging assembly 3 arranged on the bracket body 1, at an adjustable position in the direction in which the first standing pole 11 and the second standing pole 12 extend, to hang a projection screen on the bracket body 1.

Figure 2:
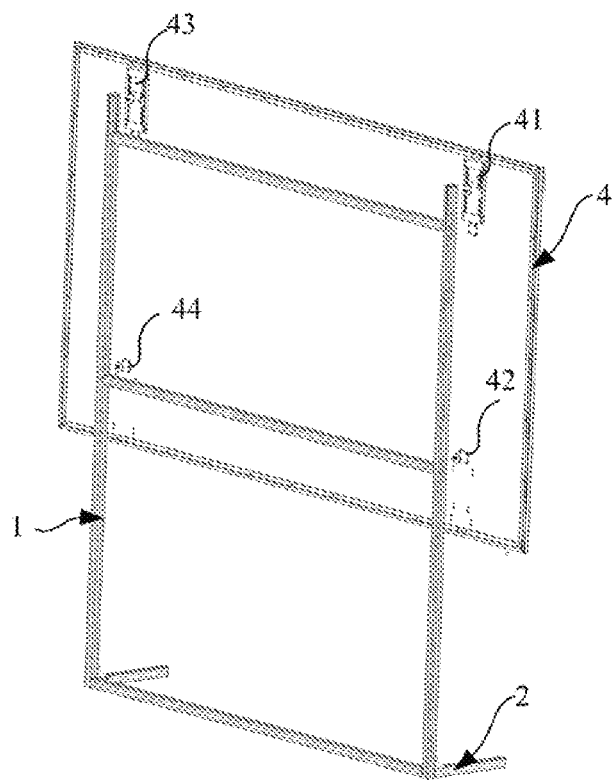
FIG. 2 is a schematic structural diagram of a projection screen installed on the projection screen supporting device according to some embodiments of the disclosure.

FIG. 2 illustrates a schematic structural diagram of the projection screen installed on the projection screen supporting device according to some embodiments of the disclosure, where the projection screen 4 is hung on the bracket body 1 by the projection screen hanging assembly 3.

In the projection screen supporting device, the quadrangular frame structure can be defined by the first standing pole 11, the second standing pole 12, the first traversing pole 13, and the second traversing pole 14 in the bracket body 1, so that the bracket body 1 can correspond in shape to the projection screen 4 to thereby support the projection screen 4. As illustrated in FIG. 2, the projection screen 4 is hung on the bracket body 1 by the projection screen hanging assembly 3, and the bracket body 1 is supported on the ground by the supporting assembly 2; if the projection screen needs to be adjusted horizontally in position, then the horizontal position of the projection screen can be adjusted by adjusting the entire projection screen supporting device horizontally in position, and also since the projection screen hanging assembly 3 can be adjusted relative to the bracket body 1 in the direction in which the first standing pole 11 and the second standing pole 12 extend, so that the projection screen 4 can be adjusted upward and downward. Accordingly when the projection screen 4 is supported by the projection screen supporting device, then the projection screen will be installed conveniently. Moreover when the projection screen is supported by the projection screen supporting device, then no additional operations, e.g., puncturing, etc., will be performed on the wall, so the wall will not be damaged.

If the projection screen 4 is supported by the projection screen supporting device without any damage to the wall, then since the position where the projection screen 4 is placed horizontally, and the position where it is placed in the direction in which the first standing pole 11 and the second standing pole 12 extend (i.e., the height at which it is placed) can be adjusted precisely through the projection screen supporting device, the projection screen can be installed conveniently.

Figure 3:
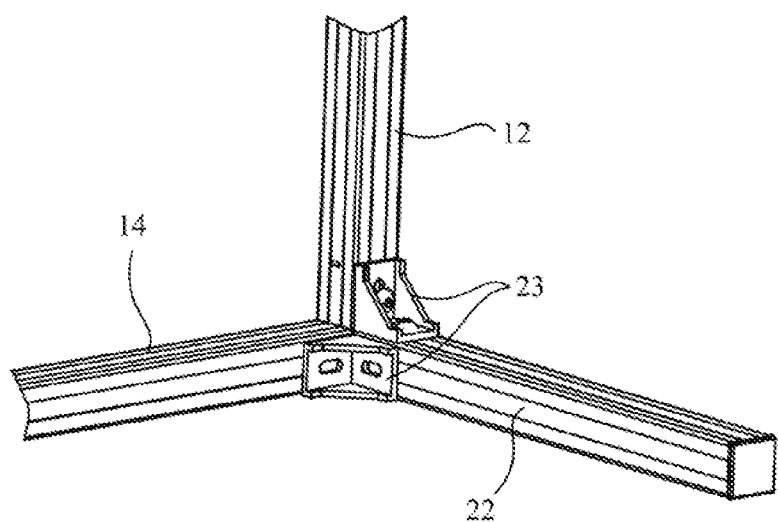
FIG. 3 is a schematic structural diagram of triangular fixing pieces arranged between a second supporting pole and a second standing pole, and between the second supporting pole and a second traversing pole in a projection screen supporting device according to some embodiments of the disclosure.

The supporting assembly 2 in the projection screen supporting device can be arranged variously, and particularly in the structure as illustrated in FIG. 1, the supporting assembly 2 can include a first supporting pole 21 and a second supporting pole 22, both of which are substantially parallel to each other, where in at least one embodiment, the first supporting pole 21 can be substantially perpendicular to the first standing pole 11 and the second traversing pole 14, and the first supporting pole 21 is fixed on the bottom end of the first standing pole 11; and the second supporting pole 22 can be substantially perpendicular to the second standing pole 12 and the second traversing pole 14, and the second supporting pole 22 is fixed on the bottom end of the second standing pole 12; and in some other embodiments, alternatively both the first supporting pole 21 and the second supporting pole 22 can be substantially perpendicular to the second traversing pole 14 but not substantially perpendicular to the second standing pole 12. In the bracket body 1 in the projection screen supporting device, the second traversing pole 14 has one end fixedly connected with the bottom end of the first standing pole 11, and the other end fixedly connected with the bottom end of the second standing pole 12, and there are triangular fixing pieces arranged between the first supporting pole 21 and the first standing pole 11, and between the first supporting pole 21 and the second traversing pole 14, and triangular fixing pieces 23 arranged between the second supporting pole 22 and the second standing pole 12, and between the second supporting pole 22 and the second traversing pole 14, as illustrated in FIG. 3.

The triangular fixing pieces arranged between the first supporting pole 21 and the first standing pole 11, and between the first supporting pole 21 and the second traversing pole 14 are structurally the same as the triangular fixing pieces 23 arranged between the second supporting pole 22 and the second standing pole 12, and between the second supporting pole 22 and the second traversing pole 14. The pole-shaped first supporting pole 21 and the second supporting pole 22 are simply structured, so that the projection screen supporting device can be sufficiently simplified in structure. Also in at least one embodiment, the first supporting pole 21 and the second supporting pole 22 can be substantially perpendicular to the quadrangular frame structure defined by the first standing pole 11, the second standing pole 12, the first traversing pole 13, and the second traversing pole 14 to thereby support stably the bracket 1; and with the triangular fixing pieces 23 arranged between the second supporting pole 22 and the second standing pole 12, and between the second supporting pole 22 and the second traversing pole 14, for example, the triangular fixing pieces 23 can be arranged to improve the stability of the connections between the second supporting pole 22 and the second standing pole 12, and between the second supporting pole 22 and the second traversing pole 14, and also enhance the strength of the projection screen supporting device as a whole. In at least one embodiment, also the triangular fixing pieces arranged between the first supporting pole 21 and the first standing pole 11, and between the first supporting pole 21 and the second traversing pole 14 can improve accordingly the stability of the connections between the first supporting pole 21 and the first standing pole 11, and between the first supporting pole 21 and the second traversing pole 14, and also enhance the strength of the projection screen supporting device as a whole.

Accordingly the projection screen supporting device is highly stable in structure, and also of high strength as a whole.

In at least one embodiment, the supporting assembly 2 can alternatively be a base fixedly connected with the bracket body, and formed on the bottom face thereof with a bottom-supporting face; or the supporting assembly 2 can alternatively be two triangular brackets. In at least one embodiment, the supporting assembly 2 can alternatively be structured otherwise as long as the entire bracket body can be placed normally (e.g., vertically or inclined relative to the vertical direction) on the horizontal plane, so a repeated description thereof will be omitted here.

In order to enable the projection screen 4 to be hung conveniently on the bracket body 1 in the projection screen supporting device, particularly as illustrated in FIG. 1, the projection screen hanging assembly 3 can include a first hanging piece 31, a second hanging piece 32, a third hanging piece 33, and a fourth hanging piece 34.

The first hanging piece 31 and the second hanging piece 32 can be slidably installed on the first standing pole 11 in the direction in which the first standing pole 11 extends, and the first hanging piece 31 is located between the second hanging piece 32, and the top end of the first standing pole 11.

The third hanging piece 33 and the fourth hanging piece 34 can be slidably installed on the second standing pole 12 in the direction in which the second standing pole 12 extends, and the third hanging piece 33 is located between the fourth hanging piece 34, and the top end of the second standing pole 12.

As illustrated in FIG. 2, there are a first hitching member 41 corresponding to the first hanging piece 31, a second hitching member 42 corresponding to the second hanging piece 32, a third hitching member 43 corresponding to the third hanging piece 33, and a fourth hitching member 44 corresponding to the fourth hanging piece 34, arranged on the backside of the projection screen 4.

Particularly if the projection screen 4 is installed on the projection screen supporting device, then the first hanging piece 31, the second hanging piece 32, the third hanging piece 33, and the fourth hanging piece 34 will be distributed like a quadrangle; the first hanging piece 31 will be connected with the first hitching member 41, the second hanging piece 32 will be connected with the second hitching member 42, the third hanging piece 33 will be connected with the third hitching member 43, and the fourth hanging piece 34 will be connected with the fourth hitching member 44, so that the projection screen 4 can be hung stably on the bracket body 1 of the projection screen supporting device; and the positions where the first hanging piece 31 and the second hanging piece 32 are fixed on the first standing pole 11, and the positions where the third hanging piece 33 and the fourth hanging piece 34 are fixed on the second standing pole 12 can be adjusted to thereby adjust the vertical height of the projection screen 4.

Particularly the first hanging piece 31 and the second hanging piece 32 can be connected with the first standing pole 11, and the third hanging piece 33 and the fourth hanging piece 34 can be connected with the second standing pole 12, in the following structure.

Figure 4:
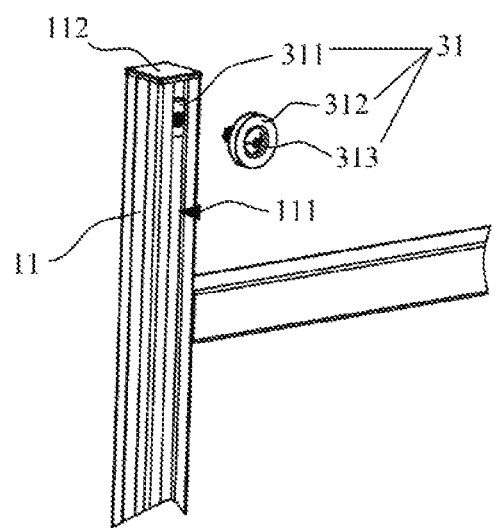
FIG. 4 is a schematic structural diagram of a first hanging piece and a first standing pole, both of which are engaged with each other, in a projection screen supporting device according to some embodiments of the disclosure.
Figure 5:
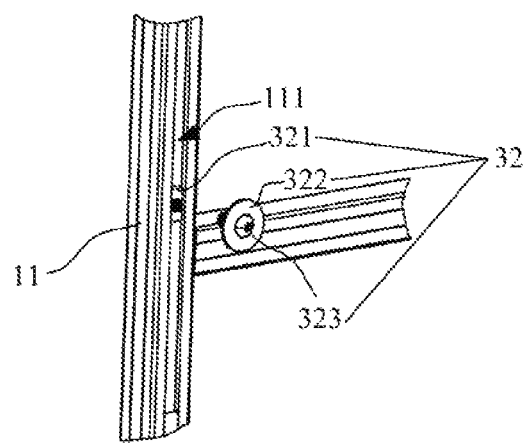
FIG. 5 is a schematic structural diagram of a second hanging piece and a first standing pole, both of which are engaged with each other, in a projection screen supporting device according to some embodiments of the disclosure.

As illustrated in FIG. 4 and FIG. 5, there is a guide groove 111 (i.e. a first slideway), extending in the direction in which the first standing pole 11 extends, arranged on the first standing pole 11, and the first hanging piece 31 and the second hanging piece 32 are slidably engaged with the first standing pole 11 through the guide groove 111 of the first standing pole 11; and the guide groove 111 arranged on the first standing pole 11 can run throughout the first standing pole 11 in the length direction thereof, or can be arranged on a part of the length of the first standing pole 11 as needed for adjusting the first hanging piece 31 and the second hanging piece 32.

Alike there is a guide groove (i.e. a second slideway), extending in the direction in which the second standing pole 12 extends, arranged on the second standing pole 12, and the third hanging piece 33 and the fourth hanging piece 34 are slidably engaged with the second standing pole 12 through the guide groove of the second standing pole 12 (not illustrated); and alike the guide groove arranged on the second standing pole 12 can run throughout the second standing pole 12 in the length direction thereof, or can be arranged on a part of the length of the second standing pole 12 as needed for adjusting the third hanging piece 33 and the fourth hanging piece 34.

More particularly if the first hanging piece 31 and the second hanging piece 32 are installed on the first standing pole 11 through the guide groove 111 arranged on the first standing pole 11, and the third hanging piece 33 and the fourth hanging piece 34 are installed on the second standing pole 12 through the guide groove of the second standing pole 12, then the first hanging piece 31, the second hanging piece 32, the third hanging piece 33, and the fourth hanging piece 34 will each include a slider, and a connection piece removably installed on the slider.

In at least one embodiment, as illustrated in FIG. 4 and FIG. 5, the guide groove 111 is arranged on a side of the first standing pole 11 facing the projection screen. Alike, the guide groove of the second standing pole 12 is arranged on a side of the second standing pole 12 facing the projection screen. Accordingly, the first hanging piece 31 and the second hanging piece 32 are installed on the side of the first standing pole 11 facing the projection screen through the guide groove 111 arranged on the first standing pole 11; and the third hanging piece 33 and the fourth hanging piece 34 are installed on the side of the second standing pole 12 facing the projection screen through the guide groove of the second standing pole 12.

As illustrated in FIG. 4 and FIG. 5, the first hanging piece 31 includes a slider 311 and a connection piece 312, where the slider 311 is slidably engaged with the guide groove 111 of the first standing pole 11, if the connection piece 312 is installed on the slider 311, then the position of the slider 311 on the first standing pole 11 will be locked, and the connection piece 312 is configured to be connected with the first hitching member 41 arranged on the backside of the projection screen 4; and the second hanging piece 32 includes a slider 321 and a connection piece 322, where the slider 321 is slidably engaged with the guide groove 111 of the first standing pole 11, if the connection piece 322 is installed on the slider 321, then the position of the slider 321 on the first standing pole 11 will be locked, and the connection piece 322 is configured to be connected with the second hitching member 42 arranged on the backside of the projection screen 4.

Figure 6:
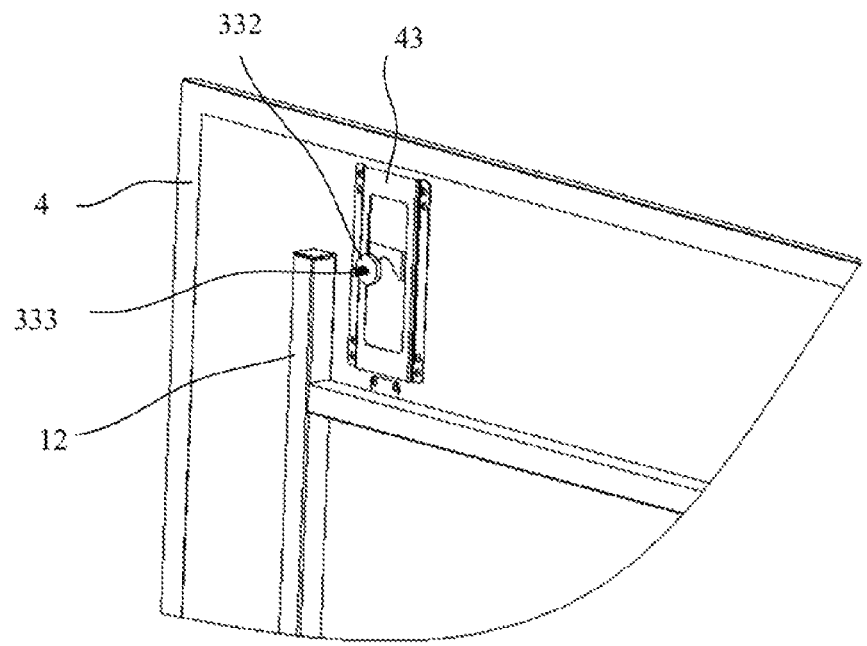
FIG. 6 is a schematic structural diagram of a projection screen hung on a third hanging piece in a projection screen supporting device according to some embodiments of the disclosure.
Figure 7:
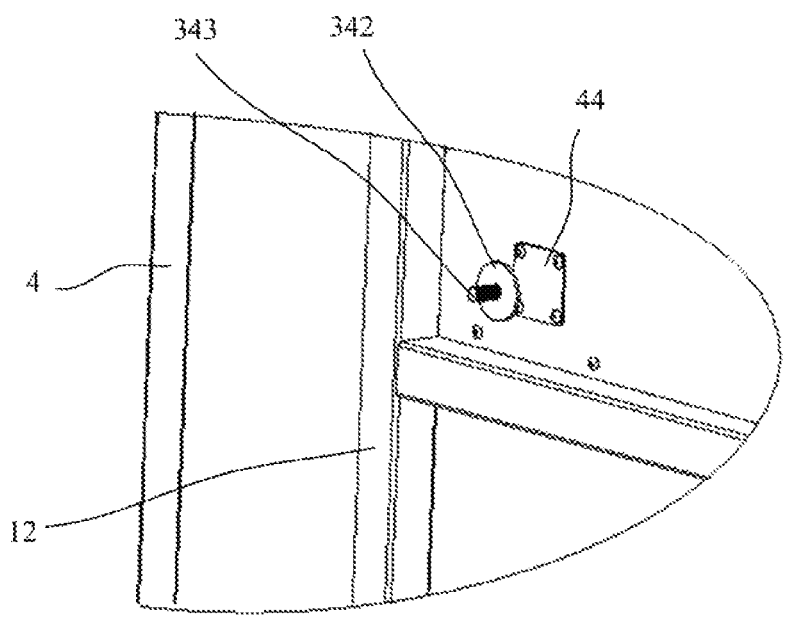
FIG. 7 is a schematic structural diagram of a projection screen hung on a fourth hanging piece in a projection screen supporting device according to some embodiments of the disclosure.

Alike as illustrated in FIG. 6 and FIG. 7, the third hanging piece 33 includes a slider (not illustrated) and a connection piece 332, where the slider is slidably engaged with the guide groove of the second standing pole 12, if the connection piece 332 is installed on the slider, then the position of the slider on the second standing pole 12 will be locked, and the connection piece 332 is configured to be connected with the third hitching member 43 arranged on the backside of the projection screen 4; and the fourth hanging piece 34 includes a slider (not illustrated) and a connection piece 342, where the slider is slidably engaged with the guide groove of the second standing pole 12, if the connection piece 342 is installed on the slider, then the position of the slider on the second standing pole 12 will be locked, and the connection piece 342 is configured to be connected with the fourth hitching member 44 arranged on the backside of the projection screen 4.

In at least one embodiment, in order to prevent the slider 311 being adjusted of the first hanging piece 31 from falling out of the guide groove 111 arranged on the first standing pole 11, there is a blocking head 112 arranged on the top end of the first standing pole 11 to block the top end of the guide groove 111 arranged on the first standing pole 11, so that if the first hanging piece 13 is adjusted to the top end of the first standing pole 11, then the blocking head 112 arranged thereon can prevent the slider 311 of the first hanging piece 31 from further moving away from the bottom end of the first standing pole 11, and hence falling out of the guide groove 111, when the slider 311 of the first hanging piece 31 slides to the top end of the first standing pole 11; and alike in order to prevent the slider being adjusted of the third hanging piece 33 from falling out of the guide groove arranged on the second standing pole 12, there is a blocking head (not illustrated) arranged on the top end of the second standing pole 12 to block the top end of the guide groove arranged on the second standing pole 12.

In at least one embodiment, in order to enable the projection screen 4 to be hung on the bracket body 1, as illustrated in FIG. 4 and FIG. 6, the connection piece 312 of the first hanging piece 31, and the connection piece 332 of the third hanging piece 33 can particularly be hanging wheels formed on the circumferential faces thereof with annular hanging grooves, axes of the annular hanging grooves coinciding with axes of the hanging wheels, as illustrated in FIG. 6. Also as illustrated in FIG. 5 and FIG. 7, the connection piece of the second hanging piece 32 is configured to be magnetically connected with the second hitching member 42 arranged on the backside of the projection screen 4, where both the connection piece of the second hanging piece 32, and the second hitching member 42 can be magnets, or one of the connection piece of the second hanging piece 32, and the second hitching member 42 can be a magnet, and the other one can be a magnetic material, or both the connection piece of the second hanging piece 32, and the second hitching member 42 can be magnetic materials, and magnetically connected with each other by a magnet; and the connection piece of the fourth hanging piece 34 is configured to be magnetically connected with the fourth hitching member 44 arranged on the backside of the projection screen 4, where both the connection piece of the fourth hanging piece 34, and the fourth hitching member 44 can be magnets, or one of the connection piece of the fourth hanging piece 34, and the fourth hitching member 44 can be a magnet, and the other one can be a magnetic material, or both the connection piece of the fourth hanging piece 34, and the fourth hitching member 44 can be magnetic materials, and magnetically connected with each other by a magnet.

In the operation process of hanging the projection screen 4 on the bracket body 1, firstly, hanging the first hitching member 41 of the projection screen 4 on the connection piece 312 of the first hanging piece 31, and the third hitching member 43 of the projection screen 4 on the connection piece 332 of the third hanging piece 33, so that the projection screen 4 is hung on the first hanging piece 31 and the third hanging piece 33 due to the gravity thereof; and then magnetically connecting the connection piece 322 of the second hanging piece 32 with the third hitching member 43 of the projection screen 4, and the connection piece 342 of the fourth hanging piece 34 with the fourth hitching member 44 of the projection screen 4, so that the projection screen 4 is connected with the bracket body 1.

Particularly as illustrated in FIG. 4, FIG. 6, FIG. 8, and FIG. 9, in the first hanging piece 31, if the connection piece 312 of the first hanging piece 31 is a hanging wheel, there will be a through-hole arranged at the center of the hanging wheel, and a threaded hole 3112 arranged in the slider 311; the hanging wheel is connected with the slider 311 through a fastening bolt 313 with a nut thereof no higher than the surface of the hanging wheel away from the slider 311; and if the hanging wheel is installed on the slider 311, then the fastening bolt 313 will be screwed, so that the surface of the slider 311 facing the hanging wheel abuts against the surface of the guide groove 111 arranged on the first standing pole 11, and there is a sufficiently large friction force between the surface of the slider 311 facing the hanging wheel, and the surface of the guide groove 111 arranged on the first standing pole 11 to thereby lock the position of the first hanging piece 31 on the first standing pole 11. Alike in the third hanging piece 33, if the connection piece 332 of the third hanging piece 33 is a hanging wheel, there will be a through-hole arranged at the center of the hanging wheel, and the hanging wheel is connected with the slider through a fastening bolt 333 with a nut thereof no higher than the surface of the hanging wheel away from the slider; and if the hanging wheel is installed on the slider, then the fastening bolt 333 will be screwed, so that the surface of the slider facing the hanging wheel abuts against the surface of the guide groove arranged on the second standing pole 12, and there is a sufficiently large friction force between the surface of the slider facing the hanging wheel, and the surface of the guide groove arranged on the second standing pole 12 to thereby lock the position of the third hanging piece 33 on the second standing pole 12.

In at least one embodiment, alternatively the slider 311 and the connection piece 312 of the first hanging piece 311 can be made integral, and the slider 331 and the connection piece 332 of the third hanging piece 33 can be made integral. Particularly the first hanging piece 31, for example, can be made as an integrated piece including the hanging wheel and the slider, where the hanging wheel is configured to hang the first hitching member 41 arranged on the backside of the projection screen 4, and also the hanging wheel can slide in the guide groove on the first standing pole 11 through the slider integral thereto, and if the position of the first hanging piece 31 on the first standing pole 11 needs to be fixed, then the integrated piece will be locked at a fixed position on the first standing pole 11 through the fastening bolt 313.

As illustrated in FIG. 5 and FIG. 7, alike the connection piece in the second hanging piece 32 can be connected with the slider 321 through the fastening bolt 323, and the connection piece in the fourth hanging piece 34 can be connected with the slider through the fastening bolt 343, so a repeated description thereof will be omitted here.

Alike in at least one embodiment, like the first hanging piece 31 and the third hanging piece 33, the slider 321 and the connection piece 322 of the second hanging piece 32 can be made as an integrated piece, and the slider 341 and the connection piece 342 of the fourth hanging piece 34 can be made as an integrated piece, so a repeated description thereof will be omitted here.

It shall be noted that, since the fastening bolt 313 of the first hanging piece 31 can be screwed via the threaded hole provided in the slider 311 of the first hanging piece 31 to make the slider 311 of the first hanging piece 31 abut against the guide groove 111 of the first standing pole 11, the fastening bolt 313 can also be considered as a connection piece, or as a component of the connection piece 312 of the first hanging piece 31. Alike, each of the other fastening bolts of the second hanging piece 32, the third hanging piece 33 and the fourth hanging piece 34 can also be considered as a connection piece, or as a component of a connection piece of a corresponding hanging piece.

That is, the connection pieces of the first to fourth hanging pieces can alternatively be structured otherwise, for example, each of the connection pieces of the first to fourth hanging pieces can include a fastening bolt, or a fastening bolt and a hanging wheel arranged on an outer end of the fastening bolt; where if a connection piece of a hanging piece includes a fastening bolt, a threaded hole is provided in a slider of the hanging piece, and the fastening bolt of the hanging piece is configured to be screwed via the threaded hole provided in the slider of the hanging piece to make the slider of the hanging piece abut against a corresponding guide groove.

Further to the respective embodiments above, in order to enable the sliders to stay at corresponding positions in the guide grooves when the connection pieces are not installed on the sliders, there are such elastic pieces arranged on the sliders in the first hanging piece 31, the second hanging piece 32, the third hanging piece 33, and the fourth hanging piece 34 that are frictionally engaged with groove walls of the guide grooves to thereby overcome the gravities of the sliders when there are no external forces applied thereto.

If there are neither pushing nor pulling forces applied to sliders, then the sliders will be frictionally engaged with the groove walls of the guide grooves due to acting forces provided by the elastic pieces, and frictional forces between the sliders, and the groove walls of the guide grooves can overcome the gravities of the sliders; furthermore if there are neither additional pushing nor pulling forces applied to sliders, then there will be no relative movement occurring between the sliders, and the groove walls of the guide grooves; and furthermore the sliders can stay at any positions in the guide grooves in the length directions of the guide grooves instead of always sliding to the bottoms of the guide grooves.

Figure 8:
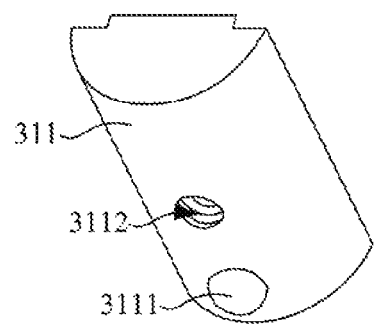
FIG. 8 is a schematic structural diagram of a slider in a projection screen supporting device according to some embodiments of the disclosure.
Figure 9:
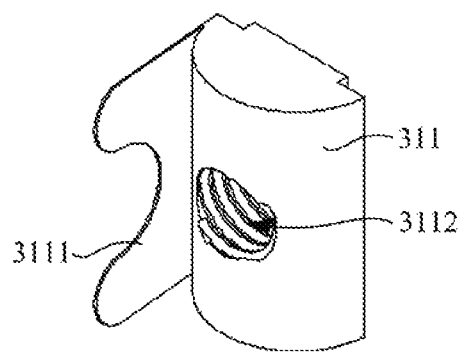
FIG. 9 is another schematic structural diagram of a slider in a projection screen supporting device according to some embodiments of the disclosure.

Particularly with the first hanging piece 31, for example, there is such an elastic piece 3111 arranged on the slider 311 that can be an elastic protrusion, and which can extend and retract in the direction substantially perpendicular to the direction in which the slider 311 slides, as illustrated in FIG. 8; or the elastic piece 3111 arranged on the slider 311 is an elastic sheet fixed on the slider 311.

In at least one embodiment, the slider 321 of the second hanging piece 32, the slider of the third hanging piece 33, and the slider of the fourth hanging piece 34 can also be structured as above, so a repeated description thereof will be omitted here.

In at least one embodiment, the elastic pieces of the sliders can alternatively be structured otherwise, although a repeated description thereof will be omitted here.

In at least one embodiment, in order to enhance the mechanical strength of the bracket body 1 as a whole, the bracket body 1 can further include such a third traversing pole 15 between the first traversing pole 13 and the second traversing pole 14 that has one end connected with the first standing pole 11, and the other end connected with the second standing pole 12, as illustrated in FIG. 1.

Particularly the third traversing pole 15 can be fixedly or fluidly connected with the first standing pole 11 and the second pole 12, for example, the third traversing pole 15 can have one end slidably installed on the first standing pole 11 in the direction in which the first standing pole 11 extends, and the other end slidably installed on the second standing pole 12 in the direction in which the second standing pole 12 extends, so that the bracket body 1 can accommodate projection screens with different sizes to be hung thereon.

Figure 10:
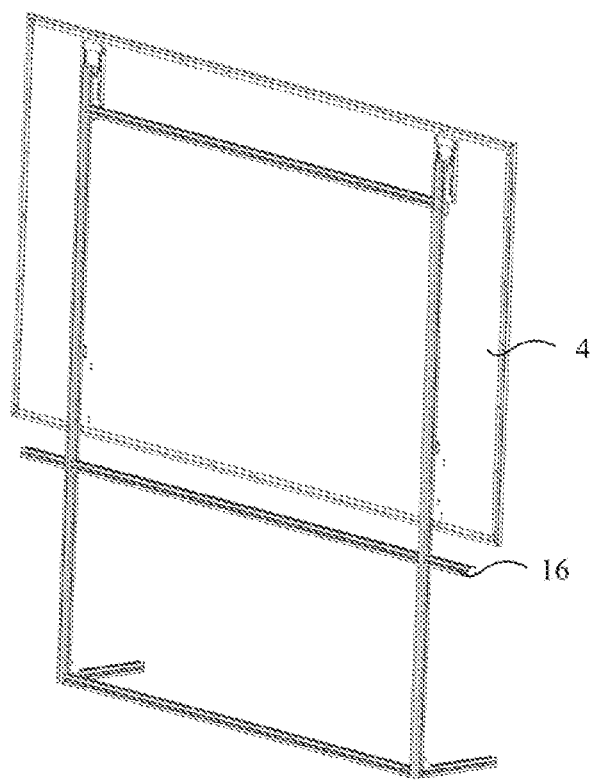
FIG. 10 is a schematic structural diagram of elongated poles on both ends of a third traversing pole in a projection screen supporting device according to some embodiments of the disclosure.

In at least one embodiment, if a peripheral device of the projection screen, e.g., a sound box, etc., needs to be hung on the bracket body 1 in the projection system, then there will be further arranged on at least one end of the third traversing pole 15 an elongated pole 16 extending beyond the gap between the first standing pole 11 and the second standing pole 12 to hang the peripheral device of the projection screen, as illustrated in FIG. 10.

In at least one embodiment, the first traversing pole 13 is in plug-in connection with the first standing pole 11 and the second standing pole 12, and/or the second traversing pole 14 is plug-in connection with the first standing pole 11 and the second standing pole 12, in the bracket body 1.

In at least one embodiment, if the third traversing pole 15 is arranged on the bracket body 1, then the third traversing pole 15 will also be plug-in connection with the first standing pole 11 and the second standing pole 12.

In order to reduce the weight of the bracket body 1, in at least one embodiment, the first standing pole 11, the second standing pole 12, the first traversing pole 13, and the second traversing pole 14 in the bracket body 1 can be of a pole-shaped aluminum material.

In at least one embodiment, a third slideway, extending in a direction in which the first traversing pole 13 extends, is arranged on the first traversing pole 13. In at least one embodiment, the third slideway is arranged on the upper side or the lower side of the first traversing pole 13.

Figure 11:
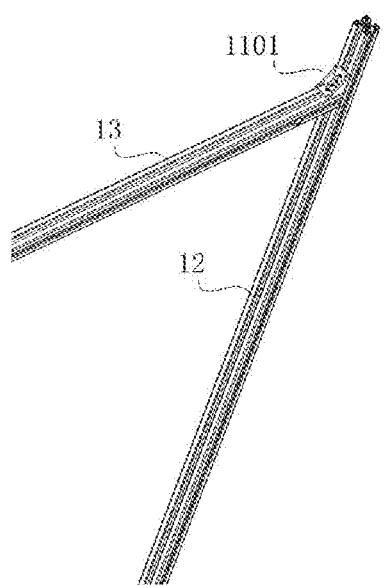
FIG. 11 is a schematic structural diagram of a triangular fixing piece arranged between a traversing pole and a standing pole in a projection screen supporting device according to some embodiments of the disclosure.
Figure 12:
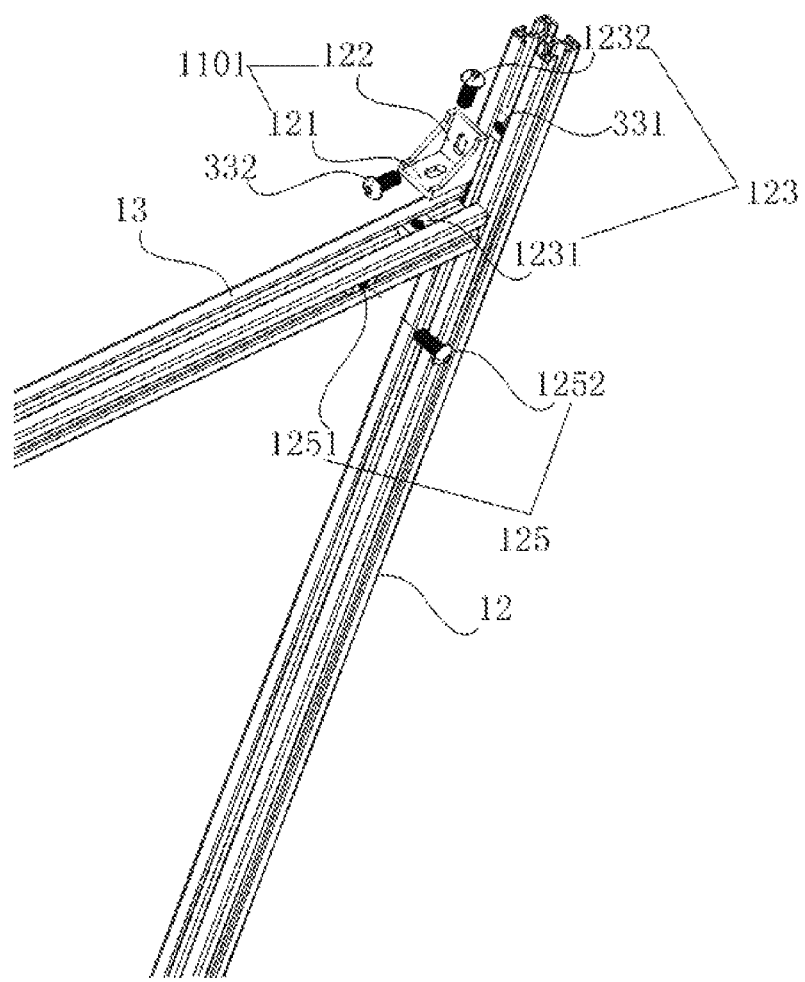
FIG. 12 is a schematic structural diagram of a second triangular fixing piece, a third hanging piece, a sixth hanging piece and an eighth hanging piece in a projection screen supporting device according to some embodiments of the disclosure.

In at least one embodiment, as illustrated in FIG. 11 and FIG. 12, the bracket body 1 further includes a first triangular fixing piece (not illustrated) and a second triangular fixing piece 1101.

Where the first triangular fixing piece includes a first sidewall and a second sidewall substantially vertical to each other, and the second triangular fixing piece 1101 includes a third sidewall 121 and a fourth sidewall 122 substantially vertical to each other; wherein holes are provided on the first sidewall, the second sidewall, the third sidewall 121 and the fourth sidewall 122 respectively.

In at least one embodiment, as illustrated in FIG. 11 and FIG. 12, the bracket body 1 further includes a fifth hanging piece (not illustrated) and a sixth hanging piece 123.

The fifth hanging piece includes a slider, and a connection piece removably installed on the slider of the fifth hanging piece, wherein the slider of the fifth hanging piece is configured to be slidably engaged with the third slideway, and the connection piece of the fifth hanging piece is configured to be arranged through the hole on the first sidewall and lock the slider of the fifth hanging piece on the third slideway to fix the first triangular fixing piece and the first traversing pole 13.

The sixth hanging piece 123 includes a slider 1231, and a connection piece 1232 removably installed on the slider 1231, wherein the slider 1231 is configured to be slidably engaged with the third slideway, and the connection piece 1232 is configured to be arranged through the hole on the third sidewall 121 and lock the slider 1231 on the third slideway to fix the second triangular fixing piece 1101 and the first traversing pole 13.

In at least one embodiment, as illustrated in FIG. 12, a guide groove of the second standing pole 12 can be arranged on a side of the second standing pole 12 facing the first standing pole (not illustrated), and a guide groove can be arranged on a side of the first standing pole facing the second standing pole 12. Accordingly, the third hanging piece and the fourth hanging piece (not illustrated) can be installed on the side of the second standing pole 12 facing the first standing pole through the guide groove of the second standing pole 12; and the first hanging piece (not illustrated) and the second hanging piece (not illustrated) can be installed on the side of the first standing pole facing the second standing pole 12 through the guide groove arranged on the first standing pole.

As illustrated in FIG. 12, the connection piece 332 of the third hanging piece (such as a fastening bolt of the third hanging piece) is configured to be arranged through the hole on the fourth sidewall 122 to fix the second triangular fixing piece 1101 and the second standing pole 12.

In a similar way, the connection piece (not illustrated) of the first hanging piece (such as a fastening bolt of the first hanging piece) is configured to be arranged through the hole on the second sidewall to fix the first triangular fixing piece (not illustrated) and the first standing pole 11.

In at least one embodiment, the first traversing pole 13 is configured to hang the projection screen.

In at least one embodiment, as illustrated in FIG. 12, the projection screen supporting device further includes a seventh hanging piece (not illustrated) and an eighth hanging piece 125.

A fourth slideway, extending in the direction in which the first traversing pole 13 extends, is arranged on another side of the first traversing pole 13 than a side of the first traversing pole 13 where the third slideway is arranged. In at least one embodiment, the fourth slideway is arranged on a side of the first traversing pole 13 facing the projection screen.

As illustrated in FIG. 12, the eighth hanging piece 125 includes a slider 1251, and a connection piece 1252 removably installed on the slider 1251, wherein the slider 1251 is configured to be slidably engaged with the fourth slideway to adjust a position of the slider 1251, and the connection piece 1252 is configured to lock the slider 1251 on the fourth slideway.

In a similar way, the seventh hanging piece (not illustrated) includes a slider, and a connection piece removably installed on the slider of the seventh hanging piece, wherein the slider of the seventh hanging piece is configured to be slidably engaged with the fourth slideway to adjust a position of the slider of the seventh hanging piece, and the seventh connection piece is configured to lock the slider of the seventh hanging piece on the fourth slideway.

The bracket body 1 is configured to hang the projection screen thereon via the seventh hanging piece and the eighth hanging piece 125.

In at least one embodiment, alike the connection pieces of the first to fourth hanging pieces, each of the connection pieces of the fifth to eighth hanging pieces can include a fastening bolt and/or a hanging wheel, so a repeated description thereof will be omitted here.

Furthermore an embodiment of the disclosure further provides a projection system including a projection screen, and the projection screen supporting device according to any one of the embodiments above of the disclosure, where the projection screen is installed on the bracket body of the projection screen supporting device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A projection system, comprising a projection screen, a projection device and a projection screen supporting device configured to install the projection screen, wherein:
   the projection screen supporting device comprises a supporting assembly, a bracket body, a first hanging piece and a second hanging piece;
   the supporting assembly is fixed on the bracket body to support the bracket body;
   the bracket body comprises a first standing pole and a second standing pole, both of which are arranged substantially parallel to each other, wherein a first slideway, extending in a direction in which the first standing pole extends, is arranged on the first standing pole, and a second slideway, extending in a direction in which the second standing pole extends, is arranged on the second standing pole;
   the first hanging piece comprises a first slider, and a first connection piece removably installed on the first slider, wherein the first slider is configured to be slidably engaged with the first slideway to adjust a position of the first slider, and the first connection piece is configured to lock the first slider on the first slideway;
   the second hanging piece comprises a second slider, and a second connection piece removably installed on the second slider, wherein the second slider is configured to be slidably engaged with the second slideway to adjust a position of the second slider, and the second connection piece is configured to lock the second slider on the second slideway; and
   the bracket body is configured to hang the projection screen thereon via the first hanging piece and the second hanging piece;
   the bracket body further comprises a first traversing pole having one end connected with the first standing pole, and the other end connected with the second standing pole;
   a third slideway, extending in a direction in which the first traversing pole extends, is arranged on the first traversing pole;
   the bracket body further comprises a first triangular fixing piece and a second triangular fixing piece;
   the first triangular fixing piece comprises a first sidewall and a second sidewall substantially vertical to each other, and the second triangular fixing piece comprises a third sidewall and a fourth sidewall substantially vertical to each other, wherein holes are provided on the first sidewall, the second sidewall, the third sidewall and the fourth sidewall respectively;
   a fifth hanging piece comprises a fifth slider, and a fifth connection piece removably installed on the fifth slider, wherein the fifth slider is configured to be slidably engaged with the third slideway, and the fifth connection piece is configured to be arranged through the hole on the first sidewall and lock the fifth slider on the third slideway to fix the first triangular fixing piece and the first traversing pole;
   a sixth hanging piece comprises a sixth slider, and a sixth connection piece removably installed on the sixth slider, wherein the sixth slider is configured to be slidably engaged with the third slideway, and the sixth connection piece is configured to be arranged through the hole on the third sidewall and lock the sixth slider on the third slideway to fix the second triangular fixing piece and the first traversing pole;
   the first connection piece is configured to be arranged through the hole on the second sidewall to fix the first triangular fixing piece and the first standing pole; and
   the second connection piece is configured to be arranged through the hole on the fourth sidewall to fix the second triangular fixing piece and the second standing pole.

2. The projection system according to claim 1, wherein the projection system further comprises a third hanging piece located between the first hanging piece and a bottom end of the first standing pole, and a fourth hanging piece located between the second hanging piece and a bottom end of the second standing pole, wherein:
   the third hanging piece comprises a third slider, and a third connection piece removably installed on the third slider, wherein the third slider is configured to be slidably engaged with the first slideway to adjust a position of the third slider, and the third connection piece is configured to lock the third slider on the first slideway; and
   the fourth hanging piece comprises a fourth slider, and a fourth connection piece removably installed on the fourth slider, wherein the fourth slider is configured to be slidably engaged with the second slideway to adjust a position of the fourth slider, and the fourth connection piece is configured to lock the fourth slider on the second slideway.

3. The projection system according to claim 1, wherein:
   the first connection piece comprises a first fastening bolt, wherein a first threaded hole is provided in the first slider, and the first fastening bolt is configured to be screwed via the first threaded hole to make the first slider abut against the first slideway; and the second connection piece comprises a second fastening bolt, wherein a second threaded hole is provided in the second slider, and the second fastening bolt is configured to be screwed via the second threaded hole to make the second slider abut against the second slideway.

4. The projection system according to claim 3, wherein:
the first connection piece further comprises a first hanging wheel arranged on an outer end of the first fastening bolt; and
the second connection piece further comprises a second hanging wheel arranged on an outer end of the second fastening bolt.

5. The projection system according to claim 1, wherein the first traversing pole is configured to hang the projection screen.

6. The projection system according to claim 1, wherein:
the projection system further comprises a seventh hanging piece and an eighth hanging piece;
a fourth slideway, extending in the direction in which the first traversing pole extends, is arranged on another side of the first traversing pole than a side of the first traversing pole where the third slideway is arranged;
the seventh hanging piece comprises a seventh slider, and a seventh connection piece removably installed on the seventh slider, wherein the seventh slider is configured to be slidably engaged with the fourth slideway to adjust a position of the seventh slider, and the seventh connection piece is configured to lock the seventh slider on the fourth slideway;
the eighth hanging piece comprises an eighth slider, and an eighth connection piece removably installed on the eighth slider, wherein the eighth slider is configured to be slidably engaged with the fourth slideway to adjust a position of the eighth slider, and the eighth connection piece is configured to lock the eighth slider on the fourth slideway; and
the bracket body is configured to hang the projection screen thereon via the seventh hanging piece and the eighth hanging piece.

7. A projection screen supporting device, comprising a supporting assembly, a bracket body, a first hanging piece and a second hanging piece; wherein:
the supporting assembly is fixed on the bracket body to support the bracket body;
the bracket body comprises a first standing pole and a second standing pole, both of which are arranged substantially parallel to each other, wherein a first slideway, extending in a direction in which the first standing pole extends, is arranged on the first standing pole, and a second slideway, extending in a direction in which the second standing pole extends, is arranged on the second standing pole;
the first hanging piece comprises a first slider, and a first connection piece removably installed on the first slider, wherein the first slider is configured to be slidably engaged with the first slideway to adjust a position of the first slider, and the first connection piece is configured to lock the first slider on the first slideway;
the second hanging piece comprises a second slider, and a second connection piece removably installed on the second slider, wherein the second slider is configured to be slidably engaged with the second slideway to adjust a position of the second slider, and the second connection piece is configured to lock the second slider on the second slideway; and the bracket body is configured to hang a projection screen thereon via the first hanging piece and the second hanging piece;
the bracket body further comprises a first traversing pole having one end connected with the first standing pole, and the other end connected with the second standing pole;
a third slideway, extending in a direction in which the first traversing pole extends, is arranged on the first traversing pole;
the bracket body further comprises a first triangular fixing piece and a second triangular fixing piece;
the first triangular fixing piece comprises a first sidewall and a second sidewall substantially vertical to each other, and the second triangular fixing piece comprises a third sidewall and a fourth sidewall substantially vertical to each other, wherein holes are provided on the first sidewall, the second sidewall, the third sidewall and the fourth sidewall respectively;
a fifth hanging piece comprises a fifth slider, and a fifth connection piece removably installed on the fifth slider, wherein the fifth slider is configured to be slidably engaged with the third slideway, and the fifth connection piece is configured to be arranged through the hole on the first sidewall and lock the fifth slider on the third slideway to fix the first triangular fixing piece and the first traversing pole;
a sixth hanging piece comprises a sixth slider, and a sixth connection piece removably installed on the sixth slider, wherein the sixth slider is configured to be slidably engaged with the third slideway, and the sixth connection piece is configured to be arranged through the hole on the third sidewall and lock the sixth slider on the third slideway to fix the second triangular fixing piece and the first traversing pole;
the first connection piece is configured to be arranged through the hole on the second sidewall to fix the first triangular fixing piece and the first standing pole; and
the second connection piece is configured to be arranged through the hole on the fourth sidewall to fix the second triangular fixing piece and the second standing pole.

8. The projection screen supporting device according to claim 7, wherein the projection screen supporting device further comprises a third hanging piece located between the first hanging piece and a bottom end of the first standing pole, and a fourth hanging piece located between the second hanging piece and a bottom end of the second standing pole, wherein:
the third hanging piece comprises a third slider, and a third connection piece removably installed on the third slider, wherein the third slider is configured to be slidably engaged with the first slideway to adjust a position of the third slider, and the third connection piece is configured to lock the third slider on the first slideway; and
the fourth hanging piece comprises a fourth slider, and a fourth connection piece removably installed on the fourth slider, wherein the fourth slider is configured to be slidably engaged with the second slideway to adjust a position of the fourth slider, and the fourth connection piece is configured to lock the fourth slider on the second slideway.

9. The projection screen supporting device according to claim 7, wherein:
the first connection piece comprises a first fastening bolt, wherein a first threaded hole is provided in the first slider, and the first fastening bolt is configured to be screwed via the first threaded hole to make the first slider abut against the first slideway; and the second connection piece comprises a second fastening bolt, wherein a second threaded hole is provided in the second slider, and the second fastening bolt is configured to be screwed via the second threaded hole to make the second slider abut against the second slideway.

10. The projection screen supporting device according to claim 9, wherein:

the first connection piece further comprises a first hanging wheel arranged on an outer end of the first fastening bolt; and the second connection piece further comprises a second hanging wheel arranged on an outer end of the second fastening bolt.

11. The projection screen supporting device according to claim 7, wherein the first traversing pole is configured to hang a projection screen.

12. The projection screen supporting device according to claim 7, wherein:

the projection screen supporting device further comprises a seventh hanging piece and an eighth hanging piece;

a fourth slideway, extending in the direction in which the first traversing pole extends, is arranged on another side of the first traversing pole than a side of the first traversing pole where the third slideway is arranged;

the seventh hanging piece comprises a seventh slider, and a seventh connection piece removably installed on the seventh slider, wherein the seventh slider is configured to be slidably engaged with the fourth slideway to adjust a position of the seventh slider, and the seventh connection piece is configured to lock the seventh slider on the fourth slideway;

the eighth hanging piece comprises an eighth slider, and an eighth connection piece removably installed on the eighth slider, wherein the eighth slider is configured to be slidably engaged with the fourth slideway to adjust a position of the eighth slider, and the eighth connection piece is configured to lock the eighth slider on the fourth slideway; and the bracket body is configured to hang a projection screen thereon via the seventh hanging piece and the eighth hanging piece.

13. A projection screen supporting device comprising a supporting assembly, a bracket body configured to hang a projection screen thereon, a first triangular fixing piece, a second triangular fixing piece, a first hanging piece, a second hanging piece, a third hanging piece, and a fourth hanging piece, wherein:

the bracket body comprises a first standing pole, a second standing pole and a first traversing pole; wherein the first standing pole and the second standing pole are arranged substantially parallel to each other, a first slideway, extending in a direction in which the first standing pole extends, is arranged on the first standing pole, a second slideway, extending in a direction in which the second standing pole extends, is arranged on the second standing pole, and a third slideway, extending in a direction in which the first traversing pole extends, is arranged on the first traversing pole;

the first triangular fixing piece comprises a first sidewall and a second sidewall substantially vertical to each other, and the second triangular fixing piece comprises a third sidewall and a fourth sidewall substantially vertical to each other; wherein holes are provided on the first sidewall, the second sidewall, the third sidewall and the fourth sidewall respectively;

the first hanging piece comprises a first slider, and a first connection piece removably installed on the first slider, wherein the first slider is configured to be slidably engaged with the first slideway, and the first connection piece is configured to be arranged through the hole on the second sidewall to lock the first slider on the first slideway to fix the first triangular fixing piece and the first standing pole;

the second hanging piece comprises a second slider, and a second connection piece removably installed on the second slider, wherein the second slider is configured to be slidably engaged with the second slideway, and the second connection piece is configured to be arranged through the hole on the fourth sidewall to lock the second slider on the second slideway to fix the second triangular fixing piece and the second standing pole;

the third hanging piece comprises a third slider, and a third connection piece removably installed on the third slider, wherein the third slider is configured to be slidably engaged with the third slideway, and the third connection piece is configured to be arranged through the hole on the first sidewall and lock the third slider on the third slideway to fix the first triangular fixing piece and the first traversing pole; and the fourth hanging piece comprises a fourth slider, and a fourth connection piece removably installed on the fourth slider, wherein the fourth slider is configured to be slidably engaged with the third slideway, and the fourth connection piece is configured to be arranged through the hole on the third sidewall and lock the fourth slider on the third slideway to fix the second triangular fixing piece and the first traversing pole;

the first traversing pole has one end connected with the first standing pole, and the other end connected with the second standing pole;

a fifth hanging piece comprises a fifth slider, and a fifth connection piece removably installed on the fifth slider, wherein the fifth slider is configured to be slidably engaged with the third slideway, and the fifth connection piece is configured to be arranged through the hole on the first sidewall and lock the fifth slider on the third slideway to fix the first triangular fixing piece and the first traversing pole;

a sixth hanging piece comprises a sixth slider, and a sixth connection piece removably installed on the sixth slider, wherein the sixth slider is configured to be slidably engaged with the third slideway, and the sixth connection piece is configured to be arranged through the hole on the third sidewall and lock the sixth slider on the third slideway to fix the second triangular fixing piece and the first traversing pole;

the first connection piece is configured to be arranged through the hole on the second sidewall to fix the first triangular fixing piece and the first standing pole; and the second connection piece is configured to be arranged through the hole on the fourth sidewall to fix the second triangular fixing piece and the second standing pole.

* * * * *